Aug. 25, 1953
M. PINTO
2,649,648
SHEAR CUTTER
Filed April 19, 1950
2 Sheets-Sheet 1
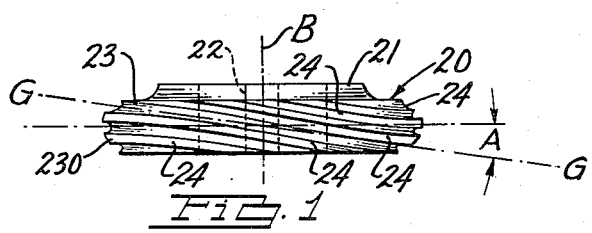
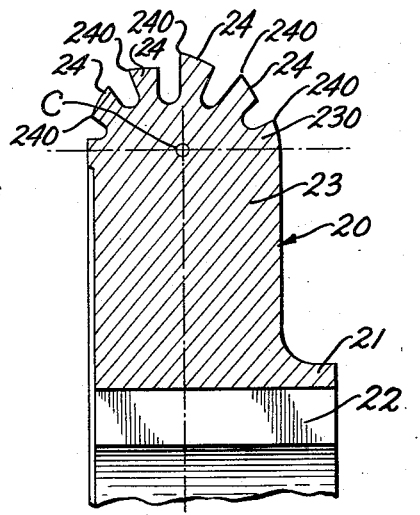
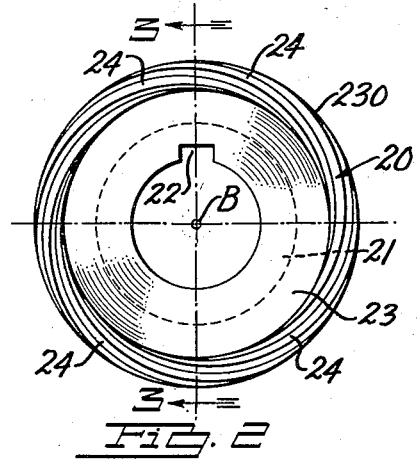
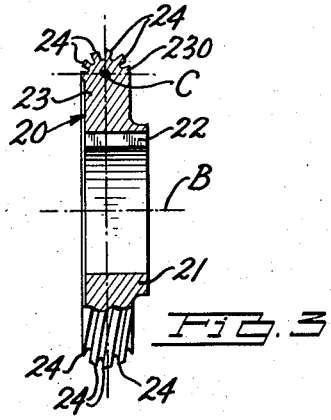
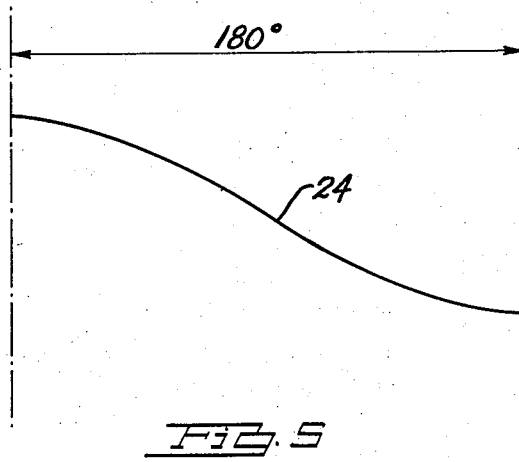
INVENTOR.
MICHAEL PINTO
BY
ATTORNEY Aug. 25, 1953     M. PINTO     2,649,648
SHEAR CUTTER
Filed April 19, 1950     2 Sheets-Sheet 2
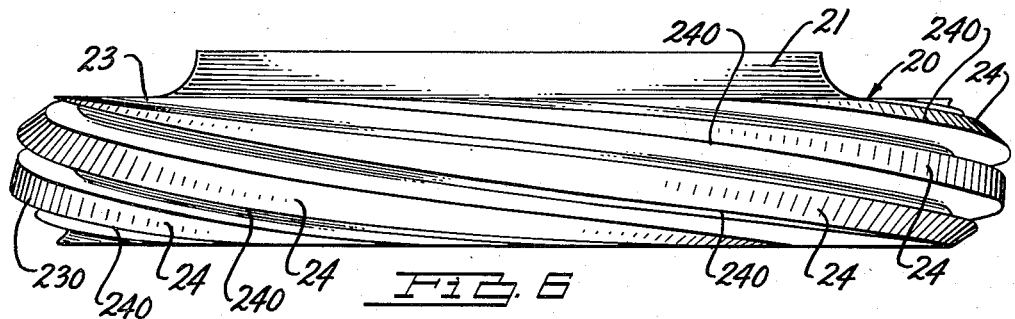
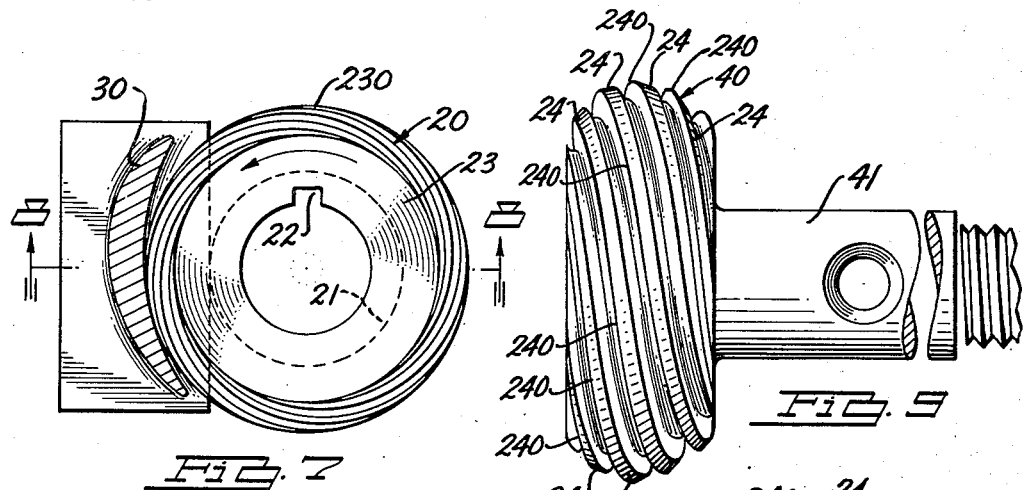
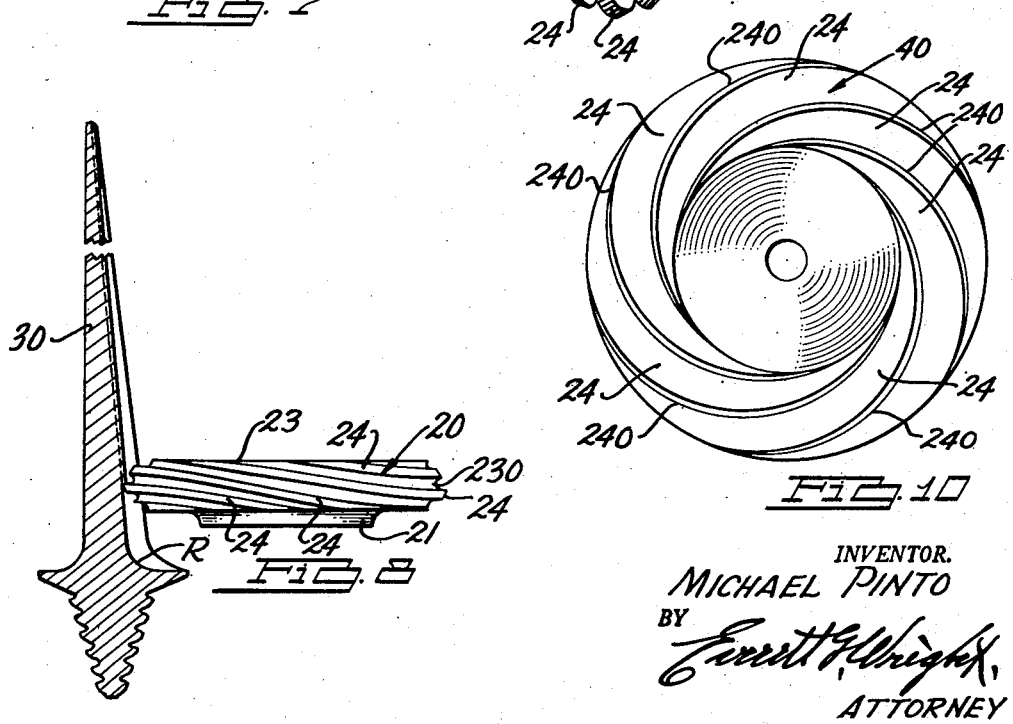
INVENTOR.
MICHAEL PINTO
BY
ATTORNEY Patented Aug. 25, 1953

2,649,648

UNITED STATES PATENT OFFICE 2,649,648

SHEAR CUTTER

Michael Pinto, Detroit, Mich., assignor to Douglas Tool Company, Detroit, Mich., a corporation of Michigan Application April 19, 1950, Serial No. 156,806

2 Claims. (Cl. 29—103)

This invention relates to metal cutting tools and in particular to improvements in metal cutting tools for cutting metal to precise shapes and contours leaving the cut metal surface substantially smooth.

In the prior art many and various types of cutting tools for cutting metal to precise shapes have been employed. However, none has proven entirely satisfactory on curved surfaces where the cut surface is required to be extremely accurate and smooth whereby to eliminate or reduce to a minimum the amount of metal removed from the cut surface if and when a final grinding or other finishing operation follows the metal cutting operation.

The primary object of the present invention is to provide a metal cutting tool of an improved construction which provides a continuous shear or shave cut which is efficient and effective, and which produces a smooth cut surface without the usual tool gashes generally found normal to or in an angular position with respect to the tool travel or cutting edge of the tool on the work.

A further object of the invention is to provide an improved metal cutting tool having a continuous shear or shave cut action which, when applied to the cutting of compound curved surfaces, generates an uninterrupted cutting condition which leaves an accurate smooth cut without tool gashes requiring very little grinding in the event a ground surface on the part is specified.

A further object of the invention is to provide a cutting tool particularly efficient and effective in the smooth cutting of tough, ductile alloy steels and in the cutting of fillets at the angular intersection of two surfaces where one of the surfaces is concave or convex as found in turbine blades for jet engines.

A still further object of the invention is to provide an improved cutting tool which, among other applications, is extremely useful in cutting either concave or convex surfaces of jet engine turbine blades and the like as they are turned or otherwise moved with respect to the rotating cutter as the said cutter is advanced therealong, the said cutter providing a shearing or shaving relationship in its attack on the work cut thereby.

Other objects of the invention will become apparent by reference to the following detailed description taken in connection with the accompanying drawings in which:

Fig. 1 is a side elevational view of a cutter having tooth form and contour embodying the invention.

Fig. 2 is a bottom elevational view.

Fig. 3 is a vertical axial sectional view taken on the line 3—3 of Fig. 2.

Fig. 4 is a greatly enlarged fragmentary sectional view similar to Fig. 3 showing one-half of the cutter and the particular form of teeth preferably employed.

Fig. 5 is a diagrammatic view showing a developed tooth contour in 180 degrees at the cutting edge of the tooth.

Fig. 6 is a greatly enlarged elevational view of a cutter embodying the invention.

Fig. 7 is a horizontal sectional view showing a cutter embodying the invention applied to the concave surface of a turbine blade.

Fig. 8 is a vertical sectional view taken on the line 8—8 of Fig. 7.

Figs. 9 and 10 are side and end views of another form of cutter embodying the invention.

Referring now to the drawings wherein like numerals refer to like and corresponding parts throughout the several views, the particular embodiment of the invention disclosed for illustrative purposes in Figs. 1-6 inclusive comprises a disc type cutter 20 composed of a hub 21 having a keyway 22 formed therein and a disc 23 extending outwardly from the said annular hub 21, the annular periphery 230 of the said disc 23 being substantially semi-circular in axial cross section and formed preferably as hereinafter more fully described into a plurality of spirally disposed cutting teeth 24, the said spiral cutting teeth 24 being cut on a relatively flat angle A, preferably ranging from 2 degrees to 20 degrees, all governed by the type of work to which the cutter is to be applied.

The spiral cutting teeth 24 of the cutter 20 are formed and ground on an angle A, preferably ranging from 2 degrees to 20 degrees, as the said cutter 20 is turned simultaneously about its longitudinal center B and about the center C of the semi-circular annular periphery thereof. The dot and dash line G—G represents the center line of the cutter or grinder employed to form the said cutter. This construction provides a series of relatively flat angle spiral teeth 24 having their cutting edges 240 disposed generally in the same direction.

As the spiral teeth 24 of the cutter 20 attack a piece of work, the cutter teeth 24 shear or slice off metal to be cut without chatter and without tooth gashes being formed in the cut surfaces of the work. Thus, a smooth surface is produced at the cut which generally needs no grinding thereafter, or, if a ground surface is specified, the grinding depth required is slight.

Tools embodying the invention operate under a continuous or uninterrupted shear cutting condition which provides a smooth progressive cutter action as distinguished from prior art cutter action where interrupted or intermittent attack of the work being cut by the cutting elements of the cutter generally occurs. The shearing or shaving action of the improved cutter herein disclosed also provides longer life than prior art cutters, which is particularly true in jet turbine blade form cutting where as high as twenty-seven turbine blades were form cut with a cutter embodying the invention without re-grinding the cutter as compared to the production of but four turbine blades with a standard cutter before the cutter became dull.

Fig. 6 shows the cutter 20 in an enlarged elevational view. Figs. 9 and 10 show a smaller cutter 40 which is like and similar to the cutter 20 previously described, the said cutter 40 being formed integral with its shaft 41.

Figs. 7 and 8 show the cutter 20 disposed in cutting relationship with respect to a turbine blade 30, the said cutter 20 being moved longitudinally upward with respect to the said turbine blade 30 while being moved laterally and arcuately with respect thereto. The said cutter 20 being employed to cut and finish cut the fillet R at the base of the said turbine blade 30.

It has been found that the employment of shear cutters embodying the invention provides the distinct advantage of the work being accurately and smoothly cut, and, shear cutters herein disclosed function more perfectly on concave and convex surfaces leaving a finish that required little or no grinding to meet exceptionally rigid smoothness specifications.

Although but two embodiments of the invention and one application thereof to work have been disclosed and described in detail, it is obvious that many changes may be made in the size, shape, arrangement and detail of the elements of the invention without departing from the spirit and scope thereof as defined by the appended claims.

I claim:
1. A rotary cutting tool comprising a flat circular plate-like disc having a substantially semi-circular axial peripheral edge cross section including a plurality of spirally disposed teeth along the said substantially semi-circular edge periphery thereof, each tooth being cut on the same spiral angle which ranges from 2 degrees to 20 degrees to a plane lying at right angles to the axis of rotation, each tooth beginning at one side of the said disc edge and ending at the other side thereof, all teeth having their cutting edges facing in the same direction.

2. A rotary cutting tool comprising a flat circular plate-like disc having a substantially semi-circular axial peripheral edge cross section including a plurality of spirally disposed teeth along the said substantially semi-circular edge periphery thereof, each tooth being cut on the same spiral angle which ranges from 2 degrees to 20 degrees to a plane lying at right angles to the axis of rotation, each tooth beginning at one side of the center of the said disc edge and ending at the other side thereof 180 degrees removed.

MICHAEL PINTO.

References Cited in the file of this patent
UNITED STATES PATENTS

| Number | Name | Date |
|---|---|---|
| 292,633 | Swyer | Jan. 29, 1884 |
| 1,807,665 | Miller | June 2, 1931 |
| 1,931,684 | Aker | Oct. 24, 1933 |
| 2,086,333 | Marcus | July 6, 1937 |
| 2,124,818 | Gouverneur | July 26, 1938 |
| 2,206,770 | Drummond | July 2, 1940 |
| 2,308,734 | Wildhaber | Jan. 19, 1943 |
| 2,346,343 | Aber | Apr. 11, 1944 |

FOREIGN PATENTS

| Number | Country | Date |
|---|---|---|
| 79,554 | Germany | Apr. 1, 1919 |